United States Patent [19]

Slaugh et al.

[11] 4,325,843

[45] Apr. 20, 1982

[54] PROCESS FOR PREPARING A SUPPORTED TUNGSTEN CARBIDE COMPOSITION

[75] Inventors: Lynn H. Slaugh; Ronald J. Hoxmeier, both of Houston, Tex.

[73] Assignee: Shell Oil Company, Houston, Tex.

[21] Appl. No.: 213,970

[22] Filed: Dec. 8, 1980

[51] Int. Cl.$^3$ .................. B01J 23/30; B01J 27/22
[52] U.S. Cl. .................................................. 252/443
[58] Field of Search ....................................... 252/443

[56] References Cited

U.S. PATENT DOCUMENTS 3,790,410  2/1974  Mund et al. ................ 252/443 X
4,219,445  8/1980  Finch .............................. 252/443

FOREIGN PATENT DOCUMENTS 2149523  4/1973  Fed. Rep. of Germany ...... 252/443

Primary Examiner—W. J. Shine

[57] ABSTRACT

A process for preparing a supported tungsten carbide composition which comprises first forming a supported tungsten oxide composition, converting the oxide to the nitride by heating in an ammonia atmosphere, and then converting the nitride to the carbide by heating in a carbiding atmosphere.

6 Claims, No Drawings

PROCESS FOR PREPARING A SUPPORTED TUNGSTEN CARBIDE COMPOSITION

FIELD OF THE INVENTION

This invention relates to a process for preparing a supported tungsten carbide composition. This composition is useful as a catalyst.

BACKGROUND OF THE INVENTION

Transition metal carbides are intriguing materials, some of which have been of industrial interest for a hundred years. These carbides possess attributes which suggest they should be valuable catalysts. It would be anticipated that they should have catalytic activity since, for example, carbides behave as metals with properties enhanced by the addition of carbon. They are electrical conductors and some are even semi-conductors at low temperatures. Their high degree of chemical inertness should allow them to be used as catalysts under hostile conditions. The carbides have unusually high thermal stabilities; consequently, they should be useful at very high temperatures without catalyst deactivation due to sintering. The technical literature reports the use of tungsten carbide as catalysts for various reactions, however, most of the work done in the literature deals with the use of bulk, powdered tungsten carbide. It would be highly advantageous to be able to provide supported tungsten carbide materials having higher surface areas. These materials in addition to being less costly than the bulk materials, would have higher activities and most likely different catalytic properties in general than the bulk materials. Attempts to convert tungsten oxide supported on acidic catalysts supports at modest temperatures, say below 800° C., have not been successful. Apparently tungsten oxide reacts with oxidic supports to produce a compound which is relatively resistant to carbonization by typical carbiding atmospheres. At higher temperatures say above 800° C. these oxidic supported materials can be converted to tungsten carbide. However, processes operating at these temperatures severely reduce the surface area of the support by sintering. The resulting materials have surface areas comparable to or only slightly greater than bulk powdered materials. A process to produce high surface area (greater than 50 meters square per gram) supported tungsten carbide materials would provide compositions that would be uniquely useful in catalytic reactions.

SUMMARY OF THE INVENTION

This invention relates to a process for preparing high surface area supported tungsten carbide compositions which process comprises impregnating an oxidic support material with a solution of a tungsten salt which is decomposable upon heating to the oxide, drying the impregnated support to remove the solvent, heating the resultant support in a non-reducing atmosphere at about 450°–700° C. to convert the tungsten salt to the oxide, heating the resultant support in ammonia at about 700°–800° C. to convert the tungsten oxide to the nitride and subsequently heating this material at about 700°–800° C. in a carbiding gas mixture comprising hydrogen and a lower alkene/alkane or carbon monoxide. Carbiding is facilitated by additions of hydrogen iodide to the carbiding gas mixture. The instant process allows for the production of supported tungsten carbide composition having high surface areas.

DESCRIPTION OF THE ILLUSTRATIVE EMBODIMENTS

The supports employed in the preparation of the compositions of the instant invention are in their broadest aspects selected from the large group of conventional, porous, refractory, oxidic catalysts carriers or support materials. Such materials may be of natural or synthetic origin. Very suitable supports comprise those of aluminous and/or siliceous composition. Specific examples of suitable supports are the aluminum oxides, magnesia, zirconia, kieselguhr, fuller's earth, silica, silica-alumina, artificial and natural zeolites and other oxide ceramics. Refractory supports particularly useful in the preparation of the compositions of the instant invention comprise the aluminous materials in particular the aluminum oxides, specifically the gamma aluminas. While the process of the instant invention is applicable to supports having widely varying surface areas, it is particularly suited to those supports having higher surface areas say above 20 square meters per gram, preferably 50 square meters per gram, because the process allows for a significant proportion of the surface area to be retained resulting in a tungsten carbide material having a relatively high surface area. Surface areas of these materials are readily determined by the B.E.T. method for determining specific surface area as is described in detail in Brunauer, S., Emmet, P. H., and Teller, E., *J. Am. Chem. Soc.*, 60, 309–16 (1938). To prepare the compositions of the instant invention the porous support is initially impregnated with a tungsten salt dissolved in a suitable solvent. This salt must be decomposable upon calcination to a tungsten oxide. Suitable solvents may be organic or inorganic, water is a preferred solvent. Any tungsten salt decomposable upon calcination to an oxide and soluble in the liquid media is useful for the impregnation. A very suitable tungsten salt is ammonium tungstate, and a suitable solvent for this salt is a dilute aqueous ammonium hydroxide solution.

Impregnation of the prior support with the tungsten salt solution is done in a conventional manner such as those typically used to impregnate catalyst supports with catalytic materials. A typical process is the so-called "dry" impregnation technique wherein just sufficient solution containing the tungsten salt is utilized to just wet the support material. This provides for a uniform distribution of tungsten throughout the support without excess solution having to be disposed of. Alternatively, excess solution can be used and the impregnated materials can be for example centrifuged to remove this excess solution.

The impregnated material described above is then dried to remove the solvent. Drying is carried out in typical fashion by, for example, heating, placing in a vacuum, blowing dry air or other dry gas across the impregnated material, or similar well known techniques. Typically the impregnated support is heated to from about 150° to about 200° C. in air or in vacuum to dry the material.

After drying, the impregnated support is calcined at a temperature ranging up to about 400° C. to about 700° C. The calcining is typically done in a neutral or oxidizing environment. Temperatures must be high enough to decompose the tungsten salt to the tungsten oxide form. This temperature is readily determined by a routine experimentation. The drying of the support to remove the solvent and the calcination can be combined in one step. The combined one step operation typically employs a programmed temperature procedure wherein the impregnated support is heated at a given rate such that the material dries as the temperature is slowly raised and then the temperature is continually raised until the material is calcined at a temperature ranging again from about 450° to about 750° C. maximum. The calcining temperatures referred to herein refer to the maximum temperatures reached in the calcining process since obviously lower temperatures must be passed through in order to reach these upper temperatures.

After calcining, the material is then heated in an ammonia atmosphere at a temperature ranging from about 700° to about 800° C. The ammonia atmosphere may be pure ammonia or it may be ammonia diluted with a suitable inert gas such as with one of the noble gasses such as argon or helium, etc. Pressures are not critical. Typically utilized is a pressure of one atmosphere partial pressure of ammonia, although higher pressures such as up to a hundred atmospheres and lower pressures can suitably be used.

After nitriding in the ammonia atmosphere the material is then heated in a carbiding gas mixture which comprises hydrogen and a carbiding component selected from the group consisting of carbon monoxide, methane, ethane, propane, ethylene, propylene, and mixtures thereof. The molar ratio of hydrogen to carbiding component in the carbiding gas mixture ranges preferably from about 2 to about 100. Optionally, the carbiding gas mixture may contain a suitable diluent such as a noble gas, for example, helium, neon, argon, krypton or xenon. When a noble gas is utilized as a diluent the molar ratio of a noble gas to carbiding component will range up to about 100. Optionally, also, hydrogen iodide is added to the carbiding gaseous mixture to facilitate the carbiding reaction. This material seems to accelerate the carbiding reaction and tends to allow carbiding temperatures to be minimized. When hydrogen iodide is utilized, the molar ratio of hydrogen iodide to carbiding component will range preferably from about 0.1 to about 4. The preferred carbiding temperature range to be utilized will typically range from about 700° C. to about 800° C.

DESCRIPTION OF THE ILLUSTRATIVE EMBODIMENTS

Preparation of $WO_3/Al_2O_3$ & Conversion to $W_2N/Al_2O_3$

Part I: Composition Preparation

In a typical preparation Kaiser KA-201 $Al_2O_3$ (SA=256 $m^2/g$) was used as catalyst support and was calcined at 500° C. for 1 hour before use. A dilute aqueous $NH_4OH$ solution of ammonium meta-tungstate was used to dry impregnate the $Al_2O_3$ to a 30% by wt. metal loading followed by drying for 1 hour in a vacuum oven at 150° C. This material was then calcined under Ar for 1 hour at 500° C. to give $WO_3/Al_2O_3$ followed by reaction in an $NH_3$ stream (400 cc/min) at 750° C. for 16 hours. After reaction the $W_2N/Al_2O_3$ was cooled to room temperature in an argon stream to prevent adsorption of $NH_3$ on the support. X-ray diffraction data on the reaction product confirmed the presence of well crystallized $W_2N$ with some W° present. Elemental analysis gave a W/N ratio of 1.0/0.9, somewhat high in nitrogen for $W_2N$ (calculated W.N = 1.0/0.5). The support surface area after nitriding was found to be 102 $m^2/g$. $W_2N/Al_2O_3$ catalysts of 50% by wt metal loadings were prepared similarly and analytical data was again consistent with the formulation of this material as largely $W_2N/Al_2O_3$ with surface areas of 95 $m^2/g$.

Conversion of $W_2N/Al_2O_3$ to $WC/Al_2O_3$

The $W_2N/Al_2O_3$ (30% by wt metal) was treated with 400 cc/min $Ar/H_2/CH_4$ (90:8:2) at 750° C. for 17 hours. X-ray data showed strong diffraction lines for WC and weaker lines for $W_2N$. Analytical data gave a N/W ratio of 0.3/1, C/W ratio of 0.9/1 and (C+N)/W ratio of 1.2/1. The surface area after carbiding was found to be 94 $m^2/g$.

The most active $WC/Al_2O_3$ catalyst (50% by wt W) was obtained by treating $W_2N/Al_2O_3$ with 430 cc/min of $H_2/HI/C_3H_8$ (94:4:2) for 16 hours at 750° C. X-ray diffraction results on this material also showed strong diffraction lines for $WC/Al_2O_3$.

Part II: Composition Utilization as Catalyst

Dealkylation, dehydrogenation & cracking reactions

In order to test the catalytic activity of the supported tungsten carbide composition prepared as described above, methylcyclohexane was chosen as a model substrate. This material can reflect not only dehydrogenation activity, but can also give an indication of dealkylation activity (toluene to benzene) and of cracking activity (methylcyclohexane to light hydrocarbons). A high pressure trickle phase reactor was used with a feed flow rate of 9.2 ml/hour using a syringe pump, 9.2 ml catalyst, LHSV=1, $H_2$/feed=4/1, $H_2$ pressure=375 lb, and 9.0 l/hr $H_2$ flow. Liquid product was collected and weighed and product composition was determined by GC analysis on an SE-30 column. Gas phase product volume was determined via flow rate through a wet test meter and gas composition was determined by GC-MS analysis. The results are shown in Table I that follow.

TABLE I

| Alumina Supported Tungsten - Carbide Composition | | | | |
|---|---|---|---|---|
| 1. Temperature | | 480° C. | | 525° C. |
| 2. Exit Gas (l/hr) | | 10.10 | | 11.76 |
| 3. Liquid Product (g/hr) | | 6.34 | | 5.42 |
| 4. Products | mmoles | $C_7$ equivs | mmoles | $C_7$ equivs |
| 5. $CH_4$ (g)[a] (dealkylation) | 1.6 | 0.2 | 3.6 | 0.5 |
| 6. $CH_4$ (g) (cracking) | 2.6 | 0.4 | 24.0 | 3.4 |
| 7. $C_2H_6$ (g) | 0.9 | 0.3 | 4.9 | 1.4 |
| 8. $C_3H_8$ (g) | 0.2 | 0.1 | 2.1 | 0.9 |
| 9. $C_4H_{10}$ (g) | 0.2 | 0.1 | 1.4 | 0.8 |
| 10. $C_5H_{12}$ (g) | 0.4 | 0.3 | 1.0 | 0.7 |
| 11. $C_4$ ave (l)[b] | 15.5 | 8.8 | 10.3 | 5.9 |
| 12. Toluene (l + g) | 25.2 | 25.2 | 47.0 | 47.0 |
| 13. Benzene (l + g) | 1.6 | 1.4 | 3.6 | 3.1 |
| 14. Feed (l + g) | 31.1 | 31.1 | 2.8 | 2.8 |
| 15. Selectivity (%) | | | | |
| 16. Toluene | | 68.5 | | 73.8 |
| 17. Benzene | | 4.3 | | 5.7 |
| 18. Aromatics | | 72.8 | | 79.5 |
| 19. Cracking | | 27.2 | | 20.5 |
| 20. Materials Balance (%) | | 94.0 | | 92.1 |
| 21. Feed Conversion (%) | | 54.2 | | 95.8 |

[a] g and l in lines 5–13 refer to "gas" and "liquid", respectively
[b] Cracked products in liquid phase assumed to have average molecular weight = $C_4H_{10}$

What is claimed is:
1. A process for preparing a supported tungsten carbide composition which comprises:
   (a) impregnating a porous oxidic support with a solution of a tungsten salt decomposable upon calcining to an oxide dissolved in a suitable solvent,
   (b) drying the support to remove the solvent,

(c) calcining the impregnated support at a temperature ranging up to about 450° C. to about 750° C.,
(d) heating the support in an ammonia atmosphere at a temperature ranging from about 700° C. to about 800° C., and
(e) heating the resultant composition at a temperature ranging from about 700° C. to about 800° C. in a carbiding gas mixture which comprises hydrogen and a carbiding component selected from the group consisting of carbon monoxide methane, ethane, propane, ethylene, propylene, and mixtures thereof.

2. The process of claim 1 wherein the surface area of the oxidic support is greater than 20 square meters per gram and the molar ratio of hydrogen to carbiding component ranges from about 2 to about 100.

3. The process of claim 1 wherein the carbiding gas mixture additionally comprises hydrogen iodide.

4. The process of claim 3 wherein the molar ratio of hydrogen to carbiding component ranges from about 2 to about 100 and the molar ratio of hydrogen iodide to carbiding component ranges from about 0.1 to about 4.

5. The process of claims 1, 2, 3 or 4 wherein the carbiding gas mixture additionally comprises a noble gas.

6. The process of claims 1, 2, 3 or 4 wherein the carbiding gas mixture comprises additionally a noble gas wherein the molar ratio of noble gas to carbiding component ranges up to about 100.

* * * * *